Sept. 6, 1955
W. C. SHAW
2,716,803
ARMATURE MAKING APPARATUS
Filed Nov. 18, 1948
7 Sheets-Sheet 1
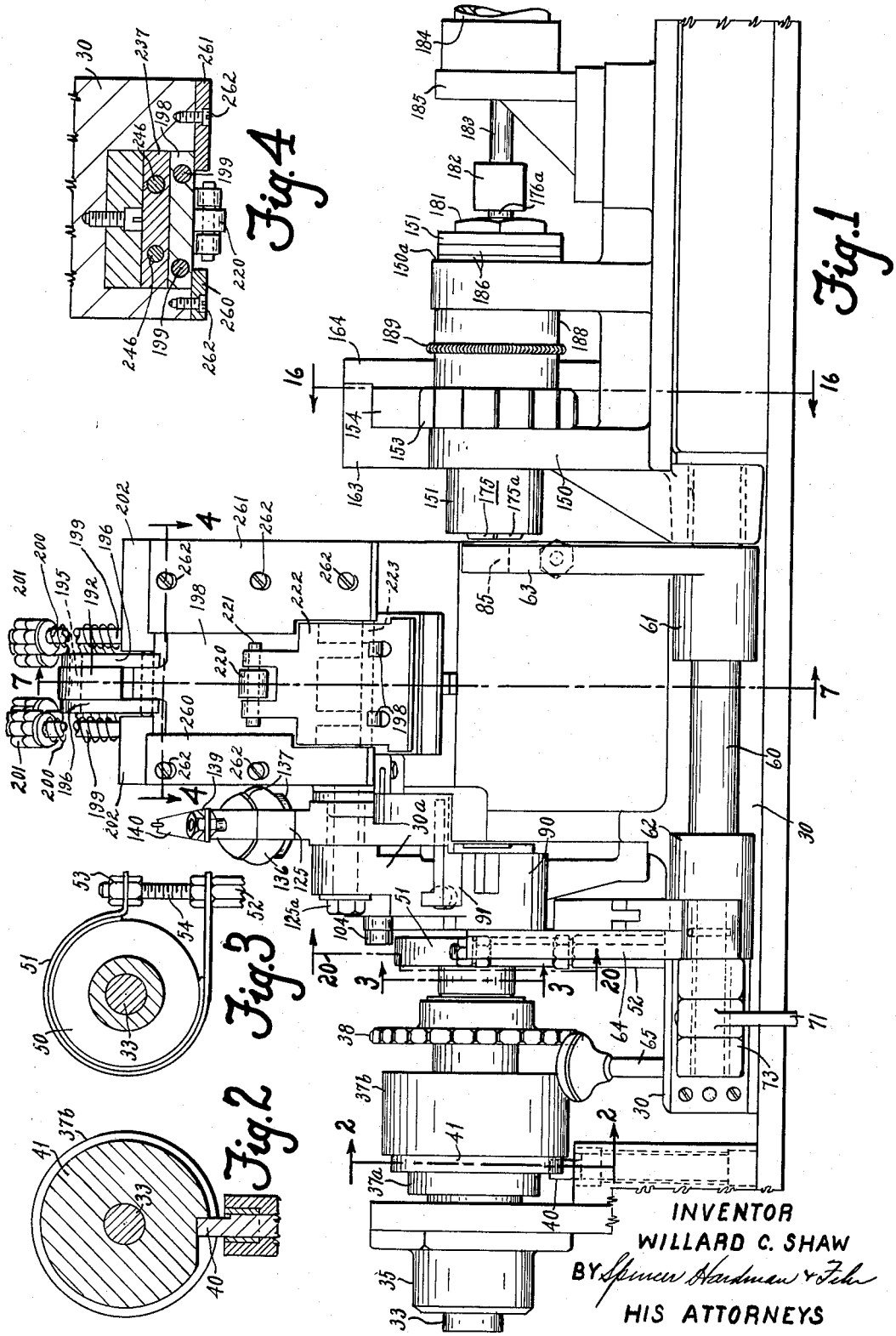
INVENTOR
WILLARD C. SHAW
BY Spencer Hardman & Febr
HIS ATTORNEYS

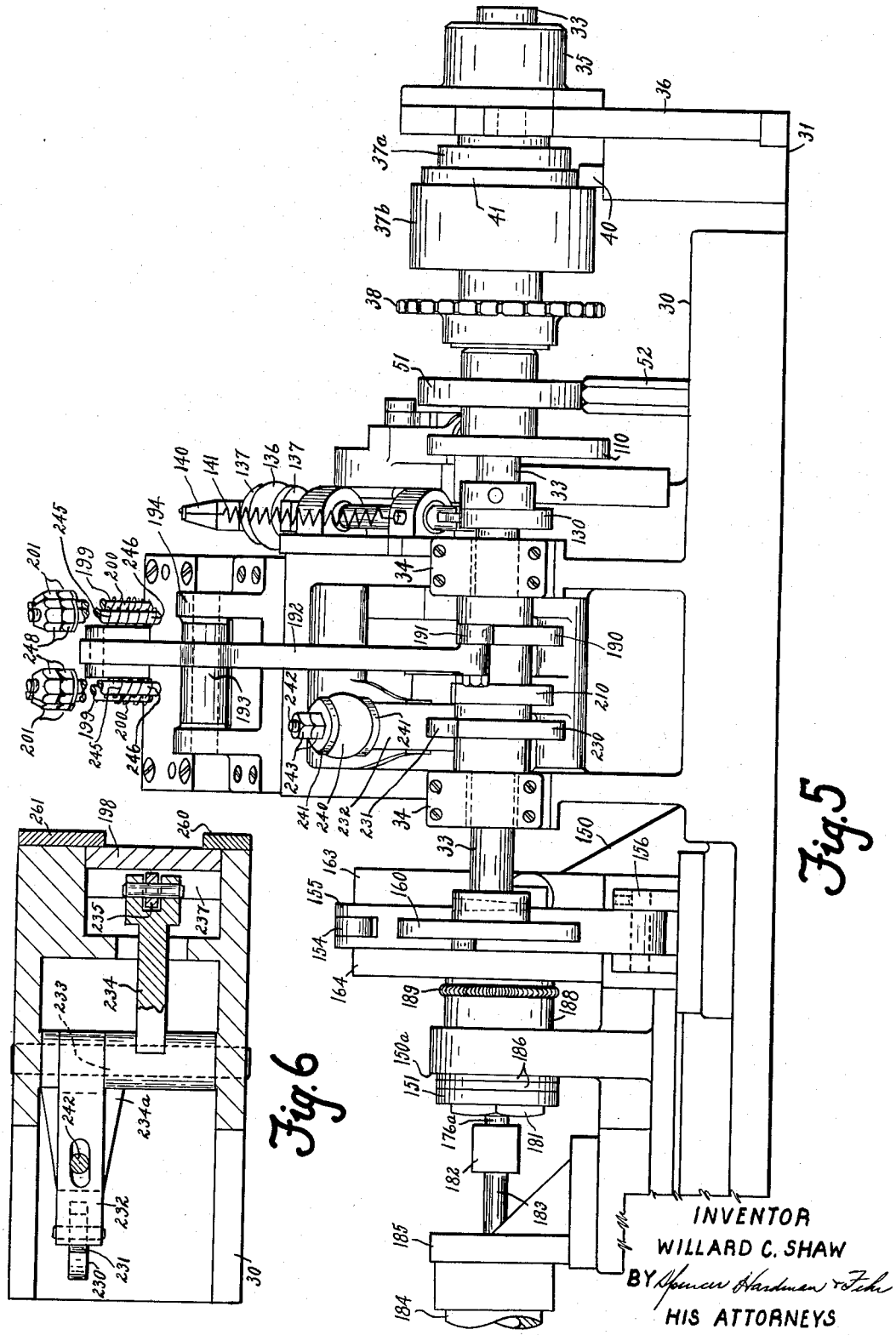

Sept. 6, 1955 W. C. SHAW 2,716,803
ARMATURE MAKING APPARATUS
Filed Nov. 18, 1948 7 Sheets-Sheet 3
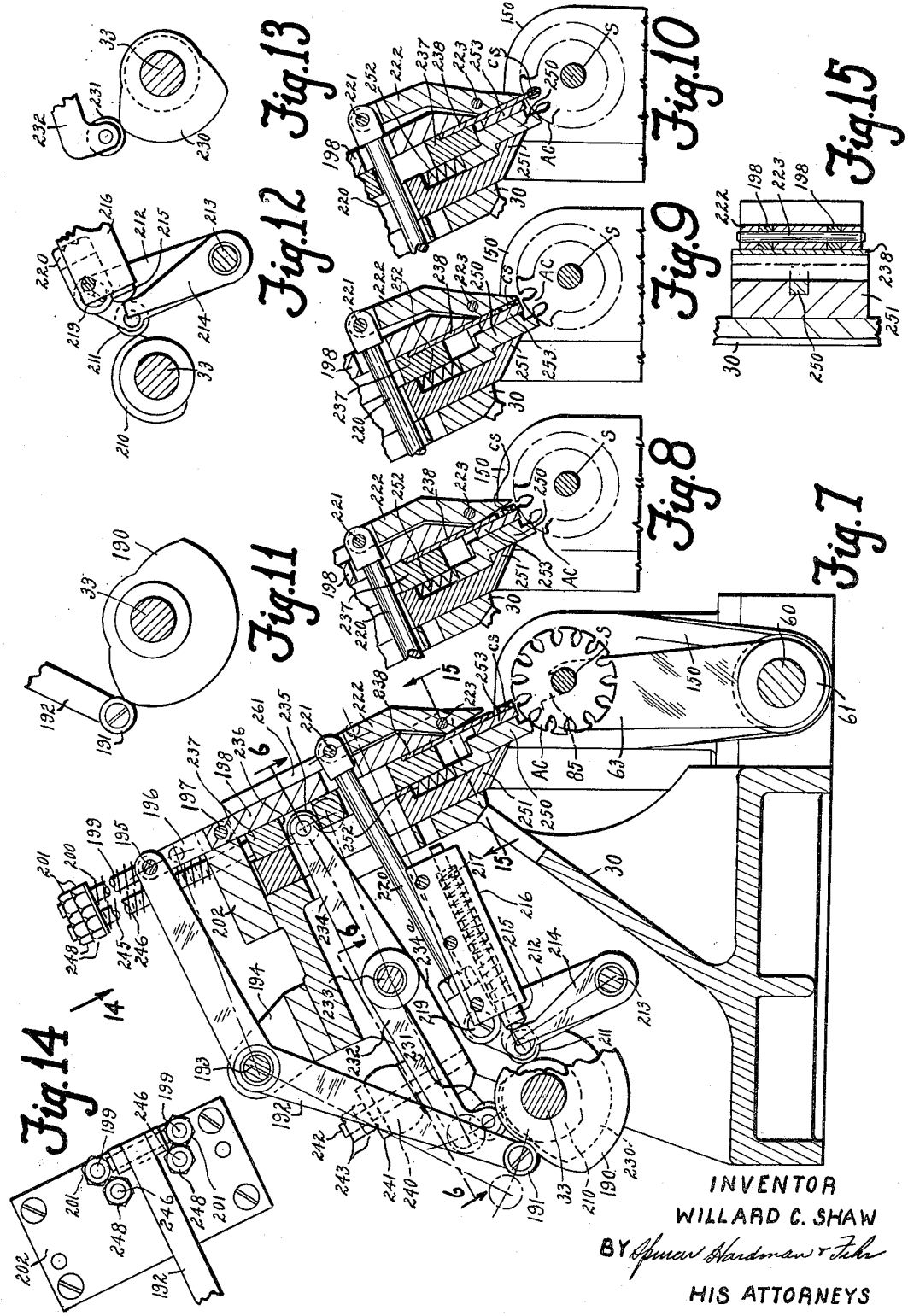
INVENTOR
WILLARD C. SHAW
BY *Spencer Hardman & Fehr*
HIS ATTORNEYS

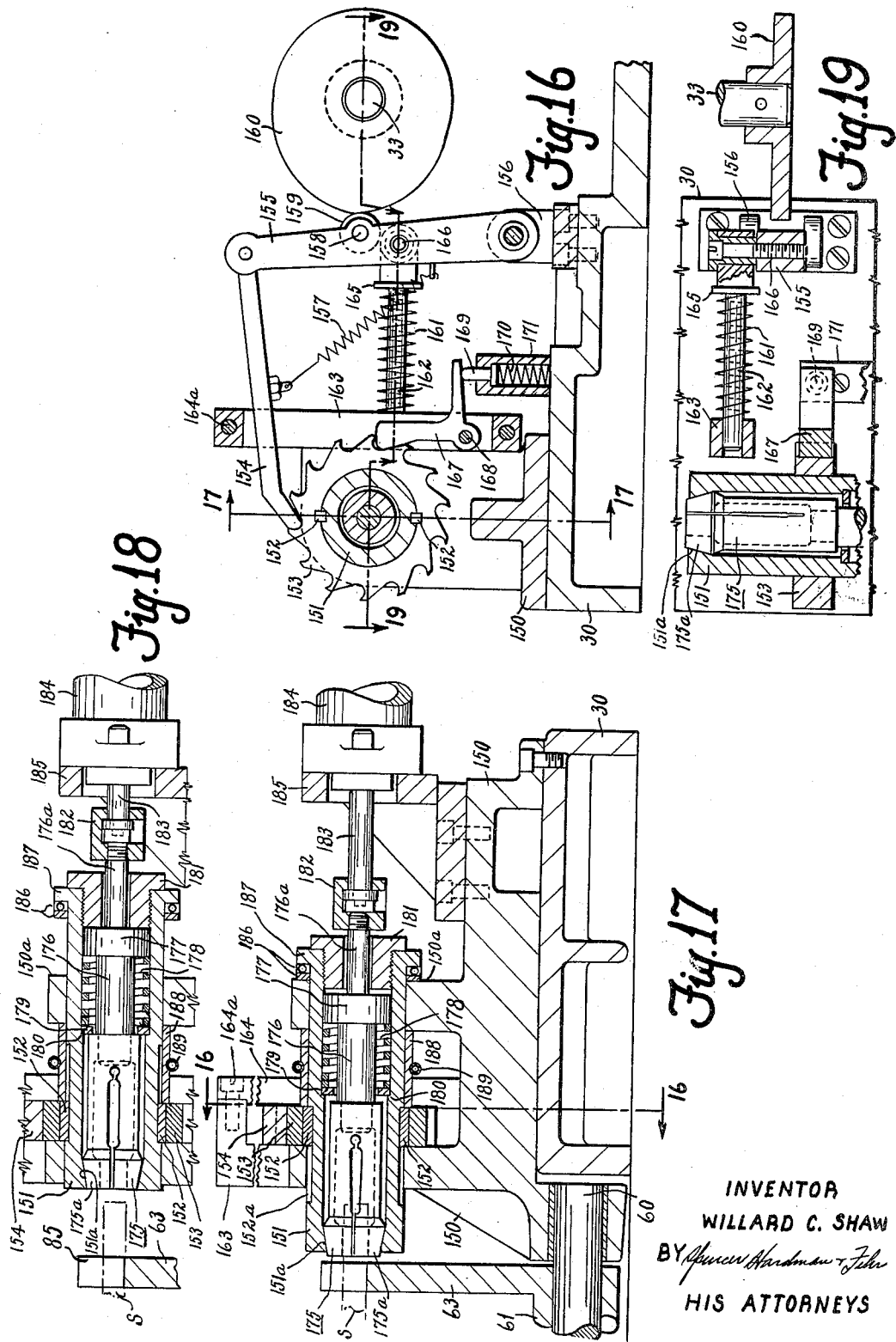

Sept. 6, 1955
W. C. SHAW
2,716,803
ARMATURE MAKING APPARATUS
Filed Nov. 18, 1948
7 Sheets-Sheet 5
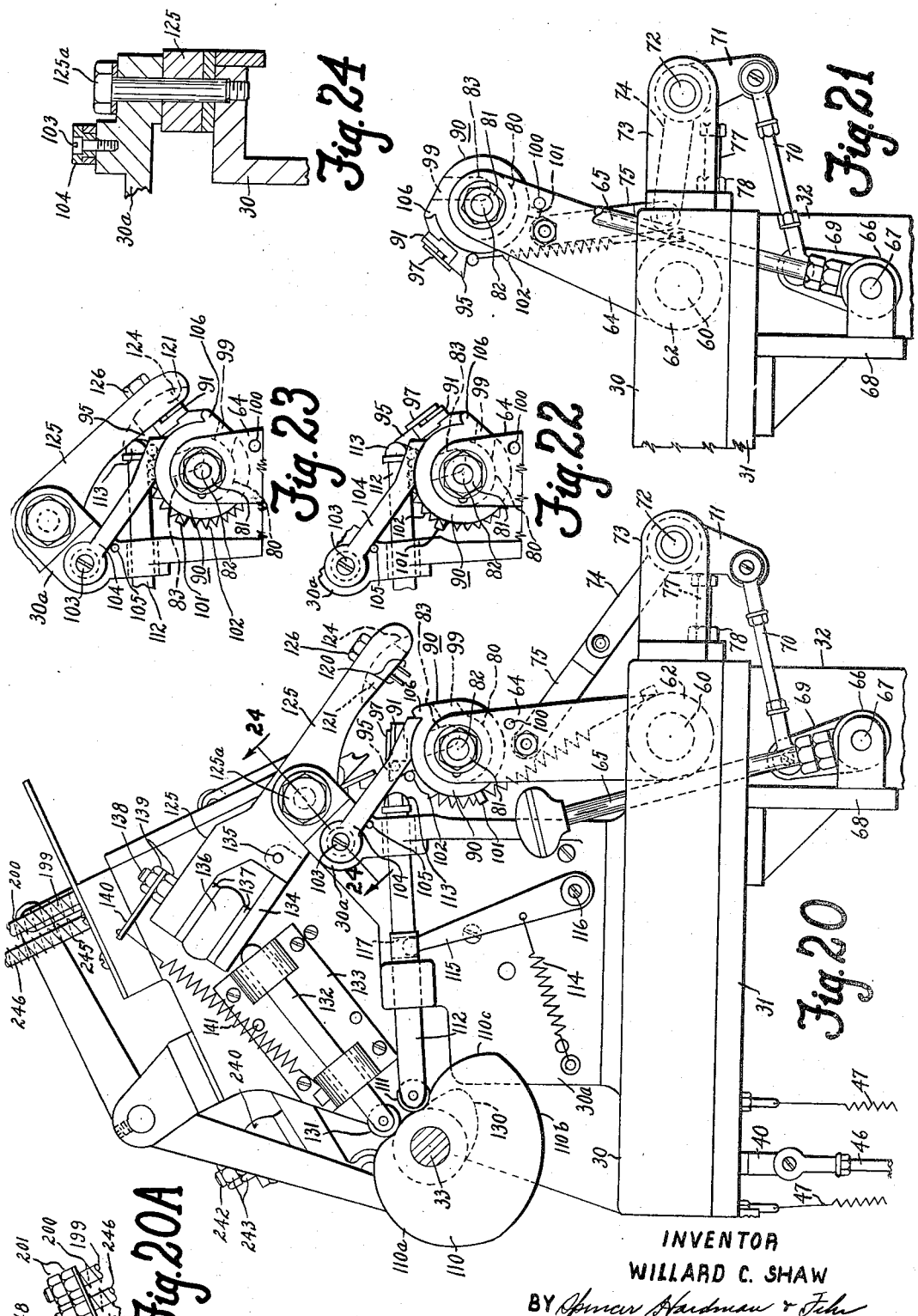
INVENTOR
WILLARD C. SHAW
BY *Spencer Hardman & Fehr*
HIS ATTORNEYS

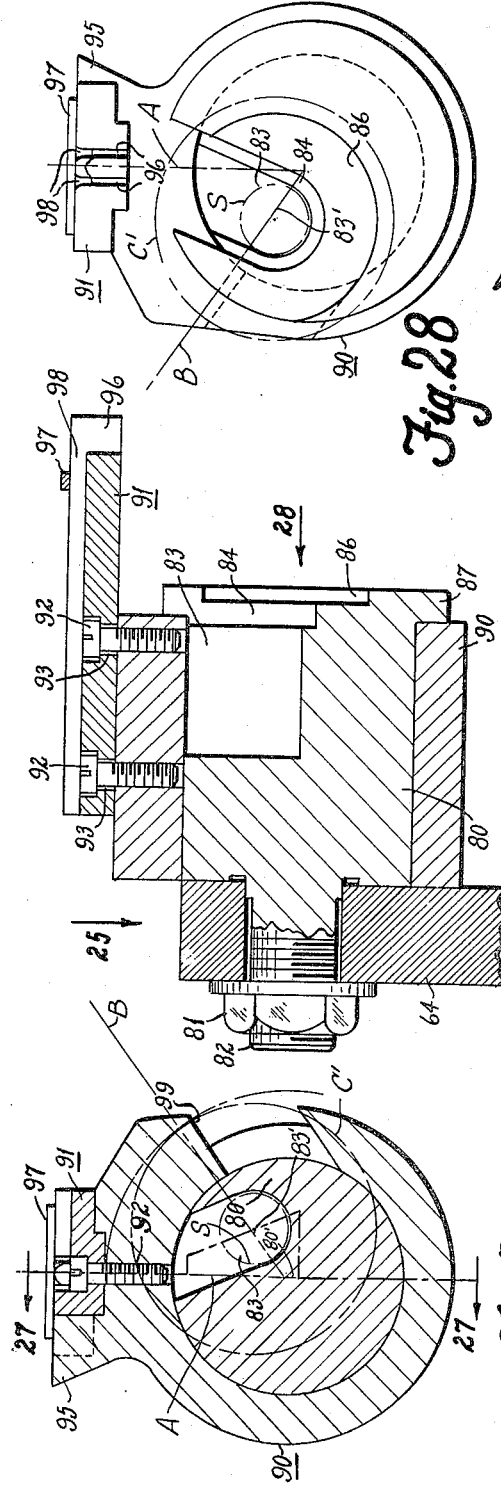

Sept. 6, 1955
W. C. SHAW
2,716,803
ARMATURE MAKING APPARATUS
Filed Nov. 18, 1948
7 Sheets-Sheet 7
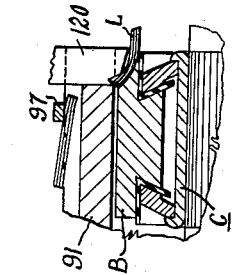
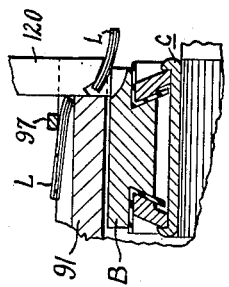
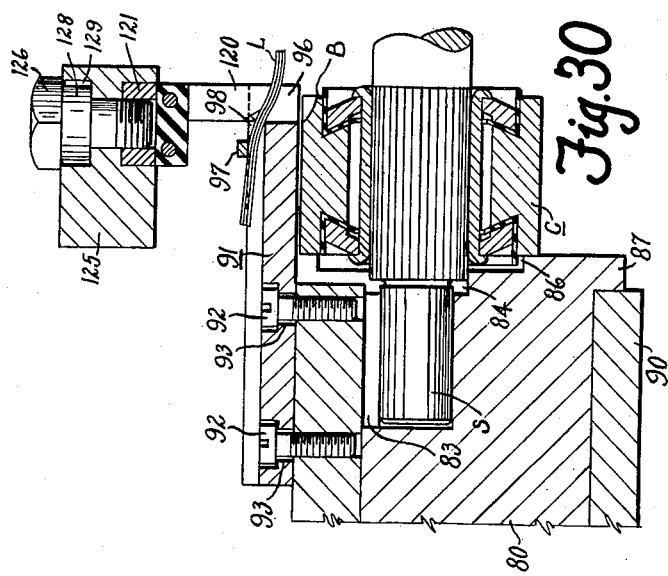
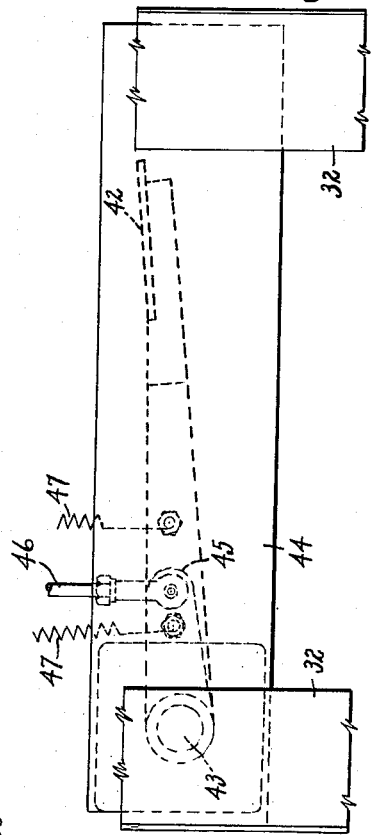
INVENTOR
WILLARD C. SHAW
BY
HIS ATTORNEYS United States Patent Office 2,716,803
Patented Sept. 6, 1955

2,716,803
ARMATURE MAKING APPARATUS
Willard C. Shaw, Anderson, Ind., assignor to General Motors Corporation, Detroit, Mich., a corporation of Delaware Application November 18, 1948, Serial No. 60,771
4 Claims. (Cl. 29—205)

This invention relates to armature assembling machines of the type disclosed in the patent to E. W. Collins et al., No. 2,074,366, granted March 23, 1937. This patent shows a machine which inserts the first of the two active sides of previously wound armature coils into armature core slots, angularly displaces the leads of the inserted coil sides into alignment with their respective commutator bars and severs the excess of length of the leads and stakes them into previously cut slots of the bars.

The objects of the present invention are to provide certain improvements in the machine of the Collins patent. In lieu of indexing the armature core by devices which engage the core teeth, as in the Collins patent, the present machine provides for indexing the core by indexing a chuck which is caused to advance to receive one end of the armature shaft and then to grip the shaft. Another feature of the present machine is an improvement in the means which squeezes the active coil side prior to its insertion in a core slot. Another improvement is in the coil lead positioning device which, in the present machine, is mounted directly upon the armature shaft support.

Further objects and advantages of the present invention will be apparent from the following description, reference being had to the accompanying drawings, wherein a preferred embodiment of the present invention is clearly shown.

In the drawings:

Fig. 1 is a front view of the present machine.

Figs. 2, 3 and 4 are sectional views, respectively, on lines 2—2, 3—3 and 4—4 of Fig. 1.

Fig. 5 is a rear view.

Fig. 6 is a sectional view on line 6—6 of Fig. 7.

Fig. 7 is a sectional view on line 7—7 of Fig. 1.

Figs. 8, 9 and 10 are fragmentary views of parts shown in Fig. 7, showing the parts in different operating positions.

Figs. 11, 12 and 13 are views of cams and cam followers respectively, which cause the movements of the parts in Figs. 8, 9 and 10 respectively.

Fig. 14 is a view in the direction of arrow 14 of Fig. 7.

Fig. 15 is a sectional view on line 15—15 of Fig. 7.

Fig. 16 is a sectional view on line 16—16 of Figs. 1 and 17.

Fig. 17 is a sectional view on line 17—17 of Fig. 16, showing the chuck advanced into armature shaft gripping position.

Fig. 18 is a view similar to Fig. 17, showing the chuck in retracted position.

Fig. 19 is a sectional view on line 19—19 of Fig. 16.

Figs. 20 and 20A form an end view of the machine, the part in section being on line 20—20 of Fig. 1.

Fig. 21 is a fragmentary view showing the armature shaft support of Fig. 20 in loading position.

Fig. 22 is a fragmentary view showing the armature coil lead locator in position for locating the leads over the proper commutator bars.

Fig. 23 is a fragmentary view showing the lead staker in operative position.

Fig. 24 is a sectional view on line 24—24 of Fig. 20.

Fig. 25 is a plan view of the armature coil lead locating device, viewed in the direction of arrow 25 of Fig. 27.

Fig. 26 is a sectional view on line 26—26 of Fig. 25.

Fig. 27 is a sectional view on line 27—27 of Figs. 25—26.

Fig. 28 is a view in the direction of arrow 28 of Fig. 27.

Fig. 29 is, in part, a diagram which shows the movement of the coil lead positioner into alignment with the proper commutator bars and to receive a staking device which is shown in longitudinal section.

Fig. 30 is a fragmentary sectional view which shows a portion of the armature support and lead positioner as shown in Fig. 27, together with a portion of the armature shaft supporting a commutator shown in section and the device for cutting the leads and staking them in position just prior to cutting a lead.

Fig. 31 is a fragmentary sectional view showing the position of the staking tool after cutting a lead.

Fig. 32 is a view similar to Fig. 31 showing the position of the lead staker after pushing the lead into a commutator bar notch.

Fig. 33 is a fragmentary side view of the machine showing a continuation of the mechanism which appears at the bottom of Fig. 20.

A frame casting 30 (Figs. 7 and 20) is supported by a table 31 having supporting legs at its corners, one being shown at 32 in Fig. 20 and two of them appearing in Fig. 33. The frame 30 (Fig. 5) supports a cam shaft 33, journaled in bearings which are retained by caps 34. Shaft 33 is supported also by bearing 35 supported by a bracket 36 attached to the table 31. Shaft 33 supports the driven member 37b of a Hilliard clutch whose driving member 37a is connected with a sprocket 38 which is driven by an electric motor (not shown) through a suitable gear reducer connected by a chain with the sprocket 38. This type of clutch is one in which the clutch is disengaged while a latching plunger 40 (Fig. 2) engages a disc 41 of the clutch. The clutch operates automatically to connect the sprocket 38 with the shaft 33 by retracting the clutch latch 40 and this is effected by downward movement of a pedal 42 shown in Fig. 33. Pedal 42 is attached to a shaft 43 pivotally supported by plate 44 attached to the table legs 32. When pedal 42 is moved downward, a lever 45 connected with shaft 43 causes downward movement of a link 46 which, as shown in Fig. 20, is connected with the clutch latch 40. As soon as the cam shaft starts rotating, the operator releases the pedal 42 and springs 47 connected with the pedal as shown in Fig. 33 and with the table 31 as shown in Fig. 20, urge the latch 40 upwardly against the disc 41 so that just prior to the end of one revolution of the cam shaft, the latch 40 is received by a notch in the disc 41 and causes it so to move that the clutch becomes disengaged and the shaft 33 stops at the end of one revolution.

The stopping of the shaft is assisted by a constantly applied brake (Figs. 1 and 3) comprising a drum 50 connected with shaft 33 (Fig. 1) and engaged by a brake-lined band 51, one end of which is secured to a post 52 and the other end of which is located under a nut 53 engaging the threaded portion 54 of the post.

Referring to Fig. 1, the base 30 and a bracket 150 attached thereto support a shaft 60 attached to the hubs 61 and 62 of levers 63 and 64 respectively. These levers are in alignment and can be moved from a loading position, which is the position of lever 64 in Fig. 21, to a work position, which is the position represented by the position of lever 64 in Fig. 20. The movement of the armature supporting levers 63 and 64 from loading to work position is effected my movement of a lever 65 having a hub 66 journaled on a pin 67 supported by a bracket 68 attached to the table 31. Hub 66 is connected with the lever 69 connected by a link 70 with a lever 71 attached to a shaft 72 journaled in a bracket 73 attached to frame 30. An arm 74 of lever 71 is connected by a link 75 with lever 64. By moving the lever 65 from the position shown in Fig. 21 to that shown in Fig. 20, the armature supporting levers 63 and 64 are caused to move into a position such that the armature shaft supported thereby will be in alignment with a chuck to be described. This position is determined accurately by a screw 77 threaded into bracket 73 and having its head engaged by lever 71 when the latter is in the position shown in Fig. 20. The screw 77 is locked in the required position of adjustment by a nut 78.

As shown in Fig. 27, the lever 64 carries a cylinder 80 secured thereto by a nut 81 engaging the threaded extension 82 of the cylinder. Cylinder 80 provides a recess or notch 83 for receiving the journal portion of armature shaft S (Fig. 30), and a recess 84 which receives a larger portion of shaft S on which the commutator C is mounted. Lever 63 (Fig. 1), is provided with a notch 85 shaped like notch 83 and in alignment therewith. Notch 85 receives the other end of the armature shaft S (shown in Fig. 18 in dot-dash lines). The cylinder 80 (Figs. 27, 30) has a recess 86 to provide clearance for certain parts of the commutator C. Cylinder 80 has a flange 87 which, together with the lever 64, retain upon the cylinder 80 the hub 90 of a wire positioner 91 attached thereto by screws 92 passing through elongated holes 93 which provide for longitudinal adjustment of the positioner 91. This adjustment is facilitated by the turning of a screw 94 (Fig. 25) threadedly engaging the part 91 and having a head which engages a lug 95 of the hub 90. If the part 91 is too far to the right in Fig. 25, the screw 94 is threaded into the part 91, which is then pushed to the left until the head of the screw 94 abuts the lug 95. If the positioner 91 is too far to the left, the screw is threaded outwardly relative to the part 91. After the desired position of part 91 has been effected, the screws 92 are tightened.

Positioner 91 provides notches 96 for receiving staking blades to be described. A bar 97 attached to part 91 cooperates with the notches to provide holes 98, (Fig. 28), into which armature coil lead wires are passed at the time the armature core is manually positioned preparatory to insertion into an armature core slot. As shown in Fig. 26, the hub 90 has a notch 99 which, in the work position (Fig. 20), of the levers 63, 64 is out of alignment with notch 83. Notch 99 is in alignment with notch 83 when these levers are in loading position, as shown in Fig. 21. This alignment is determined by the engagement with a pin 100 carried by lever 64 of a pin 101 carried by hub 90, said engagement being effected by a spring 102 connected with the hub 62 of lever 64 and with the hub 90. As shown in Fig. 20, a screw 103 supported by a bracket 30a attached to frame 30 pivotally supports a lever 104 (Figs. 20, 24), which gravitates against a stop pin 105 attached to bracket 30a. During the movement of lever 64 from the position in Fig. 21 to that shown in Fig. 20, lever 104 engages a lug 106 of hub 90 thereby causing the hub 90 to be moved relative to the cylinder 80, as shown in Fig. 20, so that the armature shaft is locked into the recess 83 of cylinder 80 by the disalignment of notch 99.

The shaft 33 (Fig. 20) is rotated clockwise. The rise 110a of cam 110 connected with shaft 33 causes a right movement of a roller 111 attached to a bar 112 guided for movement by bracket 30a and causes a knob 113 adjustably secured to bar 112 to engage the lug 95 of hub 90 to move it together with the coil lead positioner 91 into the position shown in Fig. 22. Movement of hub 90 is opposed by spring 102. Movement of bar 112 is directly opposed by a spring 114 connected with bracket 30a and with a lever 115 pivoted at 116 and having its end received by a slot 117 in bar 112. While the cam dwell 110b engages the roller 111, the positioner 91 remains at the position shown in Fig. 22; and, during engagement of the cam slope 110c with the roller 111, the spring 114 causes retraction of the bar 112 and the locator 91 returns to the position shown in Fig. 20, in which it is maintained by spring 102 which causes engagement of the lug 106 of hub 90 with the lever 104.

In Fig. 29, the circle C' represents the commutator. Cam 110 has effected movement of the positioner from the dot-dash line position 91' to the full line position 91. Its lead locating notches 96 are in position to receive lead cutting and staking blades 120 which are attached to a block 121 having a cylindrical surface 122 engaging a cylindrical surface 123 of a recess 124 in a lever 125. Engagement of block 121 with surface 123 is effected by a screw 126, the shank of which passes through an elongated opening 127 in lever 125 and a portion 128 of which is received by an elongated counterbore 129 in lever 125. The attachment of the block 121 to the lever 125 provides for an adjustment of the blades 120 so that they will be received by the notches 96 of the locator 91, when in the full line position shown in Fig. 29.

Movement of lever 125, from normal position shown in Fig. 20 to staking position shown in Fig. 23, is effected by a cam 130 driven by shaft 33 and engageable with a follower 131 pivotally supported by a rod 132 guided by bracket 133 attached to frame 30. The upper end of rod 132 is engageable with a lever 134 pivotally supported at 135 by lever 125 pivoted on a screw 125a supported by frame 30 and bracket 30a (Fig. 24). Motion imparted by rod 132 to lever 134 is transmitted to lever 125 by a flexible block 136 of rubber or the like, retained between washers 137 which a screw 138 and nuts 139 attach to the lever 125. Between nuts 139 there is clamped a plate 140 which a spring 141 connects with bracket 133. Spring 141 causes roller 131 to follow the cam 130. While the dwell 110b of cam 110 is in engagement with the roller 111, cam 130 causes movement of lever 125 from normal position into staking position, shown in Fig. 23. Figs. 30, 31 and 32 show operation of one of the staking blades 120. As shown in Fig. 30, a blade 120 has advanced from normal position into one of the slots 96 of locator 91. Fig. 31 shows that the blade 120 has cut one of the armature core lead wires L to remove the excess of wire and Fig. 32 shows the lead wire staked into a notch of a commutator bar B. In case clockwise movement of lever 125 is abnormally resisted, block 136 yields to prevent damage to the machine.

Following the wire cutting and staking operations the armature core AC is indexed an angular distance equal to the spacing of its notches. The indexing mechanism will now be described with reference to Figs. 16–19. Frame 30 supports a bracket 150 supporting a tubular shaft 151 having elongated key-ways 152a of shaft 151 receiving keys 152 which connect shaft 151 with a ratchet 153 having teeth equal in number to the armature core slots. These teeth are engaged by a pawl 154 (Fig. 16) pivotally supported by lever 155 pivoted on a bracket 156 attached to frame 30. Pawl 154 is urged counterclockwise by spring 157 which connects it with lever 155. Lever 155 carries a pin 158 pivotally supporting a roller 159, which engages a cam 160, driven by shaft 33. Roller 159 is urged into engagement with cam 160, by a spring 161 surrounding a rod 162 guided at its left end by bracket 163 attached to bracket 150. Ratchet 153 and pawl 154 are located between bracket 163 and a plate 164 which screws 164a attach to bracket 163. Spring 161 is imposed between bracket 163 and a shoulder 165 of rod 162 which is connected by pin 166 with lever 155. Cam 160 effects movement of pawl 154 to the left to cause counterclockwise rotation (in Fig. 16) of shaft 151; and spring 161 effects, when permitted by the cam, the right movement of pawl 154 to allow it to drop behind a ratchet tooth. As the pawl 154 moves right and draws along the ratchet, clockwise rotation of the latter is prevented by a pawl 167 pivoted at 168 on bracket 163 and urged counterclockwise by a plunger 169 which a spring 170, housed by a post 171, pushes upwardly. During each cycle occurring during each single revolution of cam 160, the shaft 151 is indexed an angular distance equal to the spacing of the armature core slots. This indexing will take place while no operations are being performed on the armature coil and the leads which are to be staked.

The shaft 151 provides the outer member of a collet chuck which includes a split inner clamping member 175 which is attached to a rod 176 having a larger portion 177 forming an abutment for one end of a spring 178, which is compressed between side abutment and a washer 179 engaging a shoulder 180 provided by the shaft 151. Rod 176 has a small portion 176a passing through the bushing 181 threaded into the shaft 151. Portion 176a is connected by a coupling 182 with a rod 183 connected with a piston (not shown) in a cylinder 184 attached to a bracket 185 attached to bracket 150. When pressure fluid, preferably compressed air, is admitted to the left end of cylinder 184, the chuck is moved in the position shown in Fig. 18 and it clears the right end of an armature shaft S which has been placed upon the workholder levers 64 and 63, the latter appearing in Fig. 18. When compressed air is admitted to the right end (not shown) of cylinder 184, the chuck moves to the left to the position shown in Fig. 17. During this movement, the gap between bracket surface 150a (Fig. 18) and a thrust bearing 186 abutting a flange 187 of shaft 151 is taken up; and collet chuck member 175 has advanced to receive the shaft S. Since shaft 151 can move no further toward the left, further movement of piston rod 183 toward the left causes the conical portion 175a of the contractible clutch 175 to be forced against the conical portions 151a of the shaft 151, thereby causing the chuck to grip the shaft. During movement of member 175 from non-gripping to shaft-gripping position, spring 178 is further compressed while rod portion 177 moves to the left of bushing 181, as shown in Fig. 17. Through the further compressed spring 178, a pressure is applied by the flange 187 of shaft 151 to the bearing 186 and through the latter to bracket surface 150a (Fig. 18). The friction at the bearing 186 under pressure applied by spring 178 resists rotation of shaft 151 by the indexing pawl 154 (Fig. 16) sufficiently to prevent overtravel of the shaft. After completion of the assembly of coils with the armature core by this machine, pressure fluid is admitted to the left end of cylinder 184 to cause the piston rod 183 to move right. During the initial part of this movement, spring 178 expands to force rod portion 177 against bushing 181 and the collet chuck releases its grip on the armature shaft and thereafter the chuck is moved bodily longitudinally into the position shown in Fig. 18, so that the shaft is clear of the chuck and the workholder levers 64, 63 are moved from the position shown in Fig. 20 to that shown in Fig. 21, so that the completed work can be removed and replaced by an armature shaft supporting an empty armature core and a commutator. The keys 152 are retained between the bracket 150 and a spacer comprising two half shells 188 which enclose the shaft 151 and are retained by a garter spring 189.

Referring to Figs. 7 and 11, shaft 33 drives a cam 190 which engages a roller 191 pivotally supported by lever 192 pivotally supported at 193 on a bracket 194 attached to frame 30 and connected by pin 195, links 196 and pin 197 with a bar 198 supported by frame 30 for movement from the position shown in Fig 7 to that shown in Fig. 8. The downward movement of bar 198 is accompanied by downward movement of rods 199 with which the bar is connected as shown in Fig. 4, thereby causing the further compression of springs 200 confined between nuts 201 threaded on the rods 199 and a plate 202 (Figs. 1 and 7) attached to the frame 30. Spring 200, therefore, maintains engagement of the roller 191 with the cam 190 and effects upward movement of the bar 198 when the cam 190 permits it.

A cam 210 (Figs. 7 and 12) driven by shaft 33 engages a roller 211 carried by a lever 212 attached to a shaft 213 supported by the frame 30 and connected with a lever 214 engaged by a rod 215 which is guided by bracket 216 attached to frame 30 and containing a spring 217 which urges the roller 211 against the cam 210. Lever 212 is connected by a screw 219 with a link 220 connected by a pin 221 with a lever 222 pivoted on a rod 223 (see also Fig. 15) supported by bar 198. Cam 210 operates to cause lever 222 to move clockwise and spring 217 effects movement of said lever counterclockwise when permitted by cam 210.

A cam 230 (Figs. 6, 7 and 13) driven by shaft 33 engages a roller 231 pivotally supported by a lever 232 journaled on a rod 233 supported by frame 30. Rod 233 supports a lever 234 carrying a roller 235 received in a recess 236 of a bar 237 which carries a coil inserting blade 238. Clockwise rotation of lever 232 imparts clockwise rotation to lever 234 through a resilient block 240 confined by the washers 241 through which there passes a screw 242 threadedly engaging the arm 234a of lever 234 (Fig. 6) and receiving nuts 243 which can be adjusted along the screw to place the block 240 in the required state of initial compression. Cam 230 effects movement of bar 237 from the position shown in Fig. 7 to that shown in Fig. 10; and movement of bar 237 in the opposite direction, when permitted by cam 230, is effected by springs 245 which surround rods 246 attached to bar 237 (see also Fig. 4) and which is confined under compression between plate 202 and nuts 248 threaded on the rods 246. In case downward movement of blade 238 is abnormally resisted, block 240 yields to prevent damage to the machine. Fig. 4 shows that frame 30 provides a guide-way for bars 198 and 237, the former being retained against the latter by plates 260 and 261 which screws 262 attach to the frame 30; and that bar 237 is retained against a plate 251 (see also Fig. 7) which is attached to the frame.

The operator loads the levers 63, 64 with the assembly of shaft, commutator and empty core and moves the levers into work position, thus aligning the armature shaft with the chuck with which it is to be connected. The operator truns the core into such position that a core tooth will abut a locator bar 250 supported by the plate and urged downwardly by a spring 252. As the locator 250 snaps into position between the core teeth, the attendant knows that the armature is properly located and he operates the valve which causes the chuck to advance to the shaft and to grip it. He then takes an armature coil and places the active coil side thereof which is to be at the bottom of a core slot and places it against the exposed portion of a plate 253 which is attached to plate 251. The position of this active coil side is indicated CS in Fig. 7. While the operator holds the armature coil in this position with the wire leads extending from this coil side CS passed through the holes 98 and under the bar 97 of the wire positioner (Figs. 27 and 28), the operator presses the pedal 42 (Fig. 33) to trip the clutch, thereby connecting the drive sprocket 38 (Fig. 1) with the shaft 33 for one revolution of the shaft. By movement of cam 190 into the position shown in Fig. 11, the bar 198, together with the lever 222 pivotally supported thereby, moves into the position shown in Fig. 8. Then cam 210 moves into the position shown in Fig. 12 to cause lever 222 to move into the position shown in Fig. 9, thereby squeezing the coil side CS so that it occupies radially no more space than is equal to the thickness of the blade 238. Then cam 230 moves into the position shown in Fig. 13 to cause the blade 238 to move from the position shown in Figs. 7-9 to the position shown in Fig. 10, thereby pushing the coil side CS from the space between the lever 222 and the plate 253 and inserting it into the aligned slot of the armature core AC. The cams 190, 210 and 230 operate to retract the parts and return them to the positions shown in Fig. 7; and, before the cycle is ended, indexing of the armature core in a counterclockwise direction, as viewed in Fig. 7 is effected. This cycle of operations is repeated until all of the core slots receive coil sides. The coil lead wire positioning, cutting and staking operations occur during the coil inserting operations indicated in Figs. 8–10. After the required number of coil sides CS have been inserted and their leads attached to the proper bars of the commutator, the armature shaft clutch is retracted and the assembly effected by this machine is moved to unloading position shown in Fig. 21, and the work holder levers 63, 64 are unloaded and reloaded.

As shown in Figs. 26 and 28, when cylinder 80 is in machine operating position and lead locator 91 is in lead receiving position corresponding to Fig. 20, the armature shaft end represented by circle S (adjacent to which the commutator is located) is received by the semi-cylindrical portion of recess 83 of cylinder 80, said recess portion having an axis 83′ located parallel to the axis 80′ of cylinder 80, and relatively close thereto and above axis 80′ and on one side of a vertical plane, represented by line A intersecting the axis 80′. When lead positioner 91 is moved to lead staking position shown in Figs. 22 and 29, its notches 96 are equidistant from a plane, represented by line B, which intersects axes 83′ and 80′. Therefore the forces applied by blades 120 are symmetrically disposed relative to plane B with the result that the resultant of these forces passes through axis 83′ to axis 80′. Since this resultant is not eccentrically applied to cylinder 80, staking force does not tend to turn it. Therefore cylinder 80 can be attached to arm 64 (Fig. 27) by simple means which includes a nut 81 cooperating with a screw 82 coaxial with the cylinder 80. Such attaching means provides for adjusting the cylinder 80 angularly so that the recess 83 will be properly located. The operation shown in Fig. 10 of inserting an armature coil side into a core slot causes a force to be applied to shaft S eccentrically of the cylinder 80. However the eccentricity (distance between axes 83′ and 80′) is short and the force applied is small in comparison with lead staking force and the small turning moment is easily counteracted by pressure between cylinder 80 and arm 64 caused by tightening the nut 81 (Fig. 27). Therefore, the angular location of cylinder 80 is not disturbed.

It is an advantage to use cylinder 80 as a bearing for the hub 90 of the lead locator 91 because it provides a simple mounting for movement of the locator from the lead receiving position shown in Figs. 26 and 28 to the lead staking position shown in Fig. 29, and it provides for accuracy of location of the locator in the latter position. It is desirable that the locator 91 be located for lead staking as close as possible to the commutator represented by circle C′ in Fig. 29, the inner surface of the locator being almost tangent to circle C′ at the point of intersection with line B so that the notches 96 will be directly opposite and close to those commutator bar notches into which lead wires are to be placed by blades 120. Exact alignment of notches 96 with commutator bar notches is effected by adjustment of knob 113 relative to bar 112 (Fig. 20). Because the cylinder 80 provides the mountings for the armature shaft and the lead locator, the problem of obtaining accuracy of lead locator location has been greatly simplified.

While the embodiment of the present invention as herein disclosed, constitutes a preferred form, it is to be understood that other forms might be adopted.

What is claimed is as follows:

1. In a machine for inserting, into the slots of a toothed armature core assembled with a shaft and a commutator, active coil sides of preformed armature coils, and for staking leads of the coils into notches of bars of the commutator, the combination comprising an armature shaft support including a cylinder having an open recess which receives the end of the armature shaft adjacent to which the commutator is mounted, said recess having a semi-cylindrical portion fitting the armature shaft and a portion extending from the semi-cylindrical portion upwardly to the periphery of the cylinder, said semi-cylindrical portion being located so that the axis thereof is parallel to and above the cylinder axis and at one side of a vertical plane intersecting the cylinder axis, when the armature shaft support is in machine operating position, a hub journalled on the cylinder and including a slot therethrough adapted to register normally with the open end of said recess, a lead locator carried by the hub and having two lead receiving notches, means for locating the hub so that the notches of the locator are substantially vertically above the cylinder axis, means for effecting rotation of the hub to move the slot out of register with the open end of said recess for locking the armature shaft therein and to move the locator to a position such that a plane intersecting the cylinder axis and extending midway between the notches intersects the axis of the semi-cylindrical portion of the armature shaft receiving recess of the cylinder whereby the locator moves close to the commutator supported by the armature shaft and the notches are in position to guide leads into notches of commutator bars, and means for staking the leads including blades movable through the locator notches, the staking forces applied by the blades being symmetrically disposed relative to the shaft and cylinder axes.

2. The combination according to claim 1 further characterized by the fact that the armature shaft support is movable from a loading position to a position for machine operation, and by the inclusion of means for moving the support from loading to machine operating position and for retaining it in the latter position, a spring for rotating the hub in a direction such that the lead locator moves away from staking blades, means limiting spring rotation of the hub to a definite position, means for effecting rotation of the hub against the action of said spring when the shaft support is in machine operating position to move the lead locator to a lead receiving position.

3. The combination according to claim 1 further characterized by the fact that the armature shaft support is movable from a loading position to a position for machine operation, and by the inclusion of means for moving the support from loading to machine operating position and for retaining it in the latter position, a spring for rotating the hub in a direction such that the lead locator moves away from staking blades, means limiting spring rotation of the hub, a projection provided by the hub, and an actuating member which engages the hub projection during movement of the shaft support from loading to machine operating position for subsequently effecting rotation of the hub against the action of said spring to move the lead locator to a lead receiving position.

4. The combination according to claim 1 further characterized by the fact that the armature shaft support is movable from a loading position to a position for machine operation, and by the inclusion of means for moving the support from loading to machine operating position and for retaining it in the latter position, a spring for rotating the hub in a direction such that the lead locator moves away from staking blades, means limiting spring rotation of the hub, means for effecting rotation of the hub against the action of said spring when the shaft support is in machine operating position to move the lead locator to a lead receiving position, the means for rotating the hub to position the lead locator for the staking operation including a projection provided by the hub, an axially movable rod for engaging the projection to move the hub and locator and a mechanism for moving the rod.

References Cited in the file of this patent

UNITED STATES PATENTS

| | | |
|---|---|---|
| 686,600 | Fellows | Nov. 12, 1901 |
| 971,464 | Morrill | Sept. 27, 1910 |
| 2,074,366 | Collins et al. | Mar. 23, 1937 |
| 2,192,801 | Poole | Mar. 5, 1940 |
| 2,310,774 | Garbe | Feb. 9, 1943 |
| 2,335,721 | Zagar | Nov. 30, 1943 |
| 2,453,642 | Roy | Nov. 9, 1948 |